Dec. 8, 1925.
W. F. CARTER
DISH DISPENSER
Filed Nov. 12, 1923
1,564,529
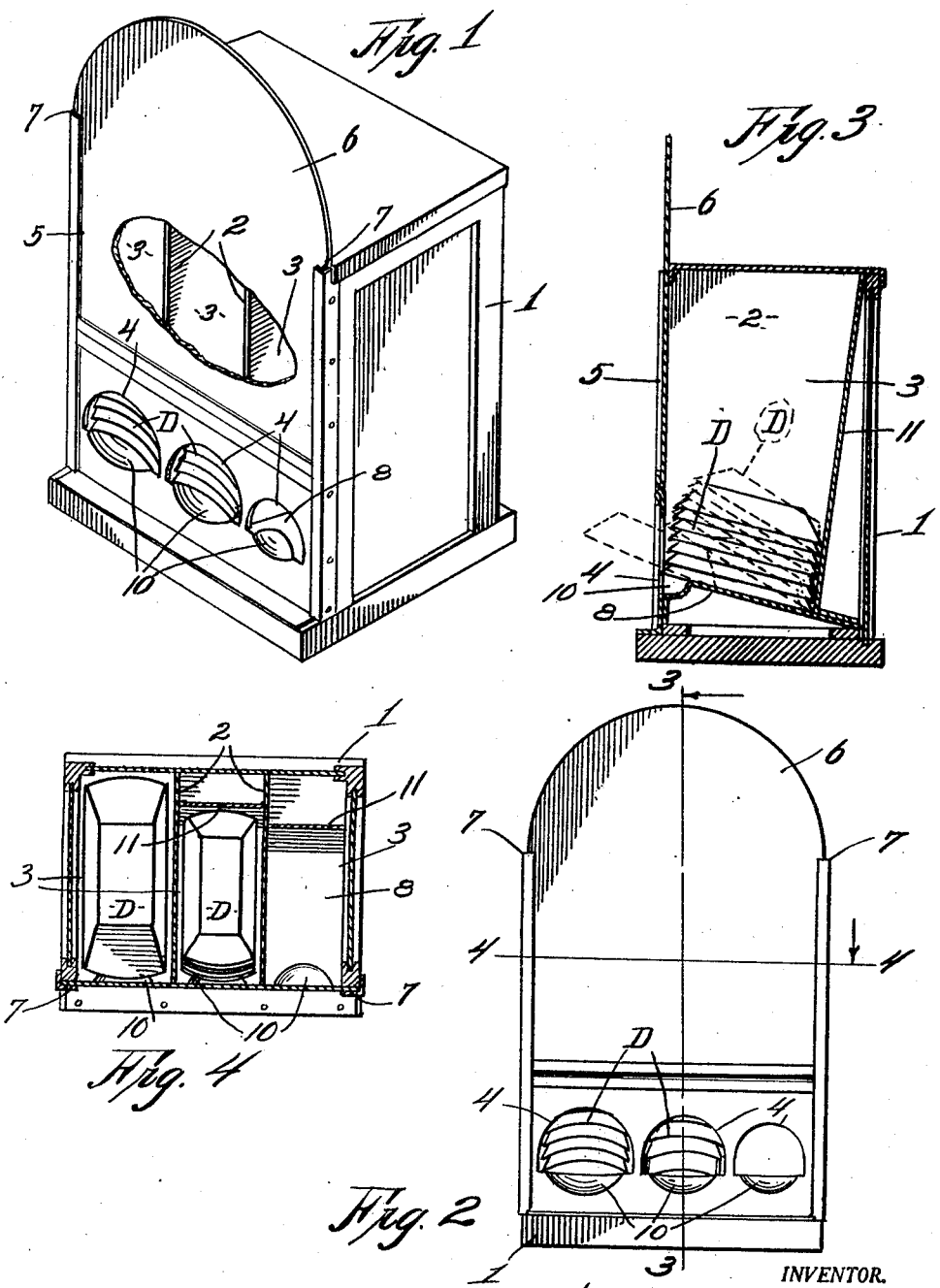
INVENTOR.
William F. Carter
BY Warren D. House
His ATTORNEY.
Witness:
R. E. Hamilton Patented Dec. 8, 1925.

1,564,529

UNITED STATES PATENT OFFICE.

WILLIAM F. CARTER, OF KANSAS CITY, KANSAS.

DISH DISPENSER.

Application filed November 12, 1923. Serial No. 674,353.

*To all whom it may concern:*

Be it known that I, WILLIAM F. CARTER, a citizen of the United States, residing at Kansas City, in the county of Wyandotte and State of Kansas, have invented a certain new and useful Improvement in Dish Dispensers, of which the following is a specification.

My invention relates to improvements in dish dispensers.

The object of my invention is to provide a dish dispenser which is simple in construction, durable, easily operated and not liable to get out of order.

The novel features of my invention are hereinafter fully described and claimed.

In the accompanying drawings, which illustrate the preferred embodiment of my invention, Fig. 1 is a perspective view, partly broken away, of my improved dish dispenser.

Fig. 2 is a front elevation of the same.

Fig. 3 is a vertical section on the line 3—3 of Fig. 2.

Fig. 4 is a horizontal section on the line 4—4 of Fig. 2.

Similar reference characters designate similar parts in the different views.

1 designates a cabinet provided with vertical partitions 2, which are unequally spaced apart, thus forming dish containers 3, of different dimensions.

The front wall of the cabinet 1 is provided with a plurality of dish discharge openings 4, of different dimensions, having upwardly converging edges, and dish insertion openings 5, above said dish discharge openings 4, and is also provided with a closure 6, which is slidably mounted in guides 7. The dish discharge openings 4 respectively communicate with the dish containers 3.

The cabinet 1 is also provided with a dish supporting member 8, located below the partitions 2, which substantially covers the bottom of the cabinet. The dish supporting member 8 is provided with a rearwardly and downwardly extending dish supporting upper surface, having at its front portion a plurality of depressions 10.

Dishes D to be dispensed are arranged in inverted positions in the containers 3, and are supported in stacks which rest upon the member 8.

The depressions 10 are in alinement and communicate respectively with the dish discharge openings 4, thus permitting the insertion of the fingers under the dishes D for the purpose of removing the dishes from the containers 3.

For the purpose of accommodating the cabinet to dishes of different lengths, some of the containers 3 are provided respectively with upwardly and rearwardly extending rear dish guiding members 11.

In the operation of my invention, the closure 6 is removed, and a stack of dishes D, formed by nesting together several dishes, having inclined sides, is inverted and inserted through the dish insertion 5 and into the proper dish container 3.

To support the dishes D in their proper positions the operator inserts one of his hands through the adjacent dish discharge opening 4, thereby supporting the dishes D and guiding them to their proper position on the dish supporting member 8. The closure 6 is then replaced in its guides.

When removing a dish from the dish dispenser, the operator inserts his fingers, or finger, in the adjacent depression 10, and underneath the stack of dishes D, then lifts the front end of the stack of dishes D until the side edges of the dish next to the bottom dish, engage the upwardly converging edges of the dish discharge opening 4, thus holding the stack in position while the bottom dish is being withdrawn through the adjacent dish discharge opening 4. The stack of dishes then drops back to its normal position, on the dish supporting member 8.

In Fig. 3 the dotted lines indicate the position of the dishes when one is being removed.

In case it is desired to remove, from the stack, two dishes at a time, the stack is raised until the third dish from the bottom engages the upwardly converging edges of the adjacent dish discharge opening 4, thus permitting the withdrawal of only the two lower dishes.

By having the dish insertion openings 5 in the front wall above the discharge openings 4, any stack of dishes may be easily removed from a container, when desired, by removing the closure 6 and lifting the stack with one hand extended through the adjacent dish discharge opening 4, the other hand being extended through the insertion opening 5 and under the lifted stack.

I do not limit my invention to the structure shown and described, as many modifications, within the scope of the appended claims, may be made without departing from the spirit of my invention.

What I claim is:—

1. A dish dispenser provided with a container having a dish discharge opening, a dish insertion opening above said dish discharge opening, a closure for said dish insertion opening, and a dish supporting member having a rearwardly and downwardly extending supporting surface having a depression at its front portion the rear edge of which depression is above and spaced apart from the lower edge of said dish discharge opening.

2. A dish dispenser provided with a cabinet having a plurality of containers of different dimensions, said containers being provided respectively with front dish discharge openings of different dimensions, dish insertions openings respectively above said dish discharge openings, a dish supporting member having a rearwardly and downwardly extending dish supporting surface provided with a plurality of depressions at its front portion the rear edges of which depressions are above and spaced apart from the respective dish discharge openings, and a part of said containers being provided respectively with rearwardly and upwardly extending rear dish guide members.

In testimony whereof I have signed my name to this specification.

WILLIAM F. CARTER.